United States Patent
Bloch et al.

(10) Patent No.: US 10,462,202 B2
(45) Date of Patent: Oct. 29, 2019

(54) MEDIA STREAM RATE SYNCHRONIZATION

(71) Applicant: JBF Interlude 2009 LTD, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Tomer Lahav, Brooklyn, NY (US)

(73) Assignee: JBF Interlude 2009 LTD, Tel Aviv-Jaffa (IL)

( * ) Notice: Subject to any disclaimer, the term of this patent is extended or adjusted under 35 U.S.C. 154(b) by 235 days.

(21) Appl. No.: 15/085,209

(22) Filed: Mar. 30, 2016

(65) Prior Publication Data

US 2017/0289220 A1  Oct. 5, 2017

(51) Int. Cl.
*H04L 29/06* (2006.01)

(52) U.S. Cl.
CPC ...... *H04L 65/4092* (2013.01); *H04L 65/4015* (2013.01); *H04L 65/80* (2013.01)

(58) Field of Classification Search
CPC .. H04L 65/4092; H04L 65/4015; H04L 65/80
USPC ................ 709/219, 231, 248, 200
See application file for complete search history.

(56) References Cited

U.S. PATENT DOCUMENTS

| | | | |
|---|---|---|---|
| 4,569,026 A | 2/1986 | Best | |
| 5,161,034 A | 11/1992 | Klappert | |
| 5,568,602 A | 10/1996 | Callahan et al. | |
| 5,607,356 A | 3/1997 | Schwartz | |
| 5,636,036 A | 6/1997 | Ashbey | |
| 5,676,551 A | 10/1997 | Knight et al. | |
| 5,734,862 A | 3/1998 | Kulas | |
| 5,737,527 A | 4/1998 | Shiels et al. | |
| 5,745,738 A | 4/1998 | Ricard | |
| 5,754,770 A | 5/1998 | Shiels et al. | |
| 5,818,435 A | 10/1998 | Kozuka et al. | |
| 5,848,934 A | 12/1998 | Shiels et al. | |

(Continued)

FOREIGN PATENT DOCUMENTS

CA  2639491 A1  3/2010
DE  004038801 A1  6/1992

(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, (4 pages).

(Continued)

*Primary Examiner* — El Hadji M Sall
(74) *Attorney, Agent, or Firm* — Goodwin Procter LLP

(57) ABSTRACT

Media streams or files, such as audio and video streams, within a media presentation are synchronized by dynamically adjusting the playback rate of one or more of the streams relative to a reference (clock) stream. In one implementation, a video presentation including a plurality of media streams is received, with each media stream having a respective playback rate. One of the media streams is selected as a clock stream. The media streams are simultaneously played according to their respective playback rates, and a second media stream is synchronized with the clock stream.

18 Claims, 4 Drawing Sheets

(56) References Cited

U.S. PATENT DOCUMENTS

| | | |
|---|---|---|
| 5,887,110 A | 3/1999 | Sakamoto et al. |
| 5,894,320 A | 4/1999 | Vancelette |
| 6,067,400 A | 5/2000 | Saeki et al. |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,482 B1 | 10/2001 | Seidman et al. |
| 6,657,906 B2 | 12/2003 | Martin |
| 6,698,020 B1 | 2/2004 | Zigmond et al. |
| 6,728,477 B1 | 4/2004 | Watkins |
| 6,801,947 B1 | 10/2004 | Li |
| 7,155,676 B2 | 12/2006 | Land et al. |
| 7,231,132 B1 | 6/2007 | Davenport |
| 7,310,784 B1 | 12/2007 | Gottlieb et al. |
| 7,379,653 B2 | 5/2008 | Yap et al. |
| 7,444,069 B1 | 10/2008 | Bernsley |
| 7,627,605 B1 | 12/2009 | Lamere et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,276,058 B2 | 9/2012 | Gottlieb et al. |
| 8,281,355 B1 | 10/2012 | Weaver et al. |
| 8,600,220 B2 | 12/2013 | Bloch et al. |
| 8,612,517 B1 | 12/2013 | Yadid et al. |
| 8,650,489 B1 | 2/2014 | Baum et al. |
| 8,826,337 B2 | 9/2014 | Issa et al. |
| 8,860,882 B2 | 10/2014 | Bloch et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,390,099 B1 | 7/2016 | Wang et al. |
| 9,465,435 B1 | 10/2016 | Zhang et al. |
| 9,520,155 B2 | 12/2016 | Bloch et al. |
| 9,530,454 B2 | 12/2016 | Bloch et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 2002/0086724 A1 | 7/2002 | Miyaki et al. |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0019905 A1 | 1/2004 | Fellenstein et al. |
| 2004/0034711 A1 | 2/2004 | Hughes |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0150072 A1 | 7/2006 | Salvucci |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0157261 A1 | 7/2007 | Steelberg et al. |
| 2007/0162395 A1 | 7/2007 | Ben-Yaacov et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0170687 A1 | 7/2008 | Moors et al. |
| 2008/0177893 A1* | 7/2008 | Bowra ............... H04N 21/2401 709/231 |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0055880 A1 | 2/2009 | Batteram et al. |
| 2009/0063681 A1 | 3/2009 | Ramakrishnan et al. |
| 2009/0077137 A1 | 3/2009 | Weda et al. |
| 2009/0083631 A1 | 3/2009 | Sidi et al. |
| 2009/0116817 A1 | 5/2009 | Kim et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |

(56) References Cited

U.S. PATENT DOCUMENTS

| | | |
|---|---|---|
| 2010/0077290 A1 | 3/2010 | Pueyo |
| 2010/0088726 A1 | 4/2010 | Curtis et al. |
| 2010/0146145 A1 | 6/2010 | Tippin et al. |
| 2010/0153512 A1 | 6/2010 | Balassanian et al. |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0186032 A1 | 7/2010 | Pradeep et al. |
| 2010/0186579 A1 | 7/2010 | Schnitman |
| 2010/0210351 A1 | 8/2010 | Berman |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0191684 A1 | 8/2011 | Greenberg |
| 2011/0191801 A1 | 8/2011 | Vytheeswaran |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2012/0004960 A1 | 1/2012 | Ma et al. |
| 2012/0005287 A1 | 1/2012 | Gadel et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0110618 A1 | 5/2012 | Kilar et al. |
| 2012/0110620 A1 | 5/2012 | Kilar et al. |
| 2012/0134646 A1 | 5/2012 | Alexander |
| 2012/0147954 A1 | 6/2012 | Kasai et al. |
| 2012/0179970 A1 | 7/2012 | Hayes |
| 2012/0198412 A1 | 8/2012 | Creighton et al. |
| 2012/0263263 A1* | 10/2012 | Olsen .................. H04L 67/16 375/354 |
| 2012/0308206 A1 | 12/2012 | Kulas |
| 2013/0028573 A1 | 1/2013 | Hoofien et al. |
| 2013/0031582 A1 | 1/2013 | Tinsman et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129308 A1 | 5/2013 | Karn et al. |
| 2013/0177294 A1 | 7/2013 | Kennberg |
| 2013/0188923 A1 | 7/2013 | Hartley et al. |
| 2013/0204710 A1 | 8/2013 | Boland et al. |
| 2013/0219425 A1 | 8/2013 | Swartz |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0308926 A1 | 11/2013 | Jang et al. |
| 2013/0328888 A1 | 12/2013 | Beaver et al. |
| 2014/0019865 A1 | 1/2014 | Shah |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0094313 A1 | 4/2014 | Watson et al. |
| 2014/0101550 A1 | 4/2014 | Zises |
| 2014/0126877 A1 | 5/2014 | Crawford et al. |
| 2014/0129618 A1 | 5/2014 | Panje et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0282013 A1 | 9/2014 | Amijee |
| 2014/0282642 A1 | 9/2014 | Needham et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0046946 A1 | 2/2015 | Hassell et al. |
| 2015/0058342 A1 | 2/2015 | Kim et al. |
| 2015/0067723 A1 | 3/2015 | Bloch et al. |
| 2015/0104155 A1 | 4/2015 | Bloch et al. |
| 2015/0179224 A1 | 6/2015 | Bloch et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0331942 A1 | 11/2015 | Tan |
| 2016/0062540 A1 | 3/2016 | Yang et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0277779 A1 | 9/2016 | Zhang et al. |
| 2016/0303608 A1 | 10/2016 | Jossick |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0289220 A1 | 10/2017 | Bloch et al. |
| 2017/0295410 A1 | 10/2017 | Bloch et al. |
| 2018/0025078 A1 | 1/2018 | Quennesson |
| 2018/0068019 A1 | 3/2018 | Novikoff et al. |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2008005288 A | 1/2008 |
| KR | 2004-0005068 A | 1/2004 |
| KR | 2010-0037413 A | 4/2010 |

(56) References Cited

FOREIGN PATENT DOCUMENTS

| WO | WO-1996/013810 A1 | 5/1996 |
|---|---|---|
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/057444 A2 | 5/2008 |
| WO | WO-2008052009 A2 | 5/2008 |
| WO | WO-2009/137919 A1 | 11/2009 |

OTHER PUBLICATIONS

Archos Gen 5 English User Manual Version 3.0, Jul. 26, 2007, pp. 1-81.
Barlett, Mitch, "iTunes 11: How to Queue Next Song," Technipages, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report for International Patent Application PCT/IL2010/000362 dated Aug. 25, 2010 (2 pages).
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report and Written Opinion for International Patent Application PCT/IB2013/001000 dated Jul. 31, 2013 (12 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP10774637.2 (PCT/IL2010/000362) dated Jun. 20, 2012 (6 pages).
Supplemental European Search Report for EP13184145 dated Jan. 30, 2014 (6 pages).
Yang, H, et al., "Time Stamp Synchronization in Video Systems," Teletronics Technology Corporation, <http://www.ttcdas.com/products/daus_encoders/pdf_tech_papers/tp_2010_time_stamp_video_system.pdf>, Abstract, (8 pages).
U.S. Appl. No. 12/706,721 U.S. Pat. No. 9,190,110 Published as US2010/0293455, System and Method for Assembling a Recorded Composition, filed Feb. 17, 2010.
U.S. Appl. No. 13/033,916 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 14/884,285, System and Method for Assembling a Recorded Composition, filed Oct. 15, 2015.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 Published as US2015/0199116, Videos Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821, System and Method for Synchronization of Selectably Presentable Media Streams, filed Dec. 30, 2015.
U.S. Appl. No. 13/921,536 Published as US2014/0380167, Systems and Methods for Multiple Device Interaction with Selectably Presentable Media Streams, filed Jun. 19, 2013.
U.S. Appl. No. 14/107,600 Published as US2015/0067723, Methods and Systems for Unfolding Video Pre-Roll, filed Dec. 16, 2013.
U.S. Appl. No. 14/335,381 Published as US2015/0104155, Systems and Methods for Real-Time Pixel Switching, filed Jul. 18, 2014.
U.S. Appl. No. 14/139,996 Published as US2015/0181301, Methods and Systems for In-Video Library, filed Dec. 24, 2013.
U.S. Appl. No. 14/140,007 Published as US2015/0179224, Methods and Systems for Seeking to Non-Key Frames, filed Dec. 24, 2013.
U.S. Appl. No. 14/249,627 Published as US2015/0294685, Systems and Methods for Creating Linear Video From Branched Video, filed Apr. 10, 2014.
U.S. Appl. No. 14/249,665 Published as US2015/0293675, Dynamic Timeline for Branched Video, filed Apr. 10, 2014.
U.S. Appl. No. 14/509,700 Published as US2016/0104513, Systems and Methods for Dynamic Video Bookmarking, filed Oct. 8, 2014.
U.S. Appl. No. 14/534,626 Published as US2016/0105724, Systems and Methods for Parallel Track Transitions, filed Nov. 6, 2014.
U.S. Appl. No. 14/700,845, Systems and Methods for Nonlinear Video Playback Using Linear Real-Time Video Players, filed Apr. 30, 2015.
U.S. Appl. No. 14/700,862, Systems and Methods for Seamless Media Creation, filed Apr. 30, 2105.
U.S. Appl. No. 14/835,857, Systems and Methods for Adaptive and Responsive Video, filed Aug. 26, 2015.
U.S. Appl. No. 14/978,464, Intelligent Buffering of Large-Scale Video, filed Dec. 22, 2015.
U.S. Appl. No. 14/978,491, Seamless Transitions in Large-Schale Vidoe, filed Dec. 22, 2015.

* cited by examiner

MEDIA STREAM RATE SYNCHRONIZATION

FIELD OF THE INVENTION

The present disclosure relates generally to streaming media and, more particularly, to systems and methods for synchronizing video and audio streams through dynamic adjustment of playback rate.

BACKGROUND

Streaming media presentations, such as online videos, often include separate audio and video streams, or tracks. Some of these media presentations also include multiple video and/or audio streams that are played in parallel, so that a user can switch among the streams and continue playback of a new stream at the same point in time where he or she left off in the previous stream. In either case, it is generally desirable to synchronize the streams to align audio and video as well as provide for seamless transitions among streams.

SUMMARY

Systems and methods for media stream synchronization are disclosed. In one aspect, a video presentation having multiple media streams is received. The media streams each have an associated playback rate that can be modified to speed up or slow down the playback rate of the stream. One of the streams is selected as a clock, or reference, stream. The media streams are simultaneously played according to their respective playback rates, and the other media streams are synchronized with the clock stream during playback.

The synchronization can be performed for multiple time intervals, which can be of fixed or variable length. To synchronize a second media stream with the clock stream, the playback rate of the second media stream can be modified at the end of a first time interval to cause the playback time of the second media stream to be substantially the same as the playback time of the clock stream at the end of a second, later time interval.

In one implementation, the synchronization includes determining that an end of a first time interval has been reached; determining, at the end of the first time interval, a current playback time of the clock stream and a current playback time of the second media stream; and modifying the playback rate of the second media stream based on the current playback time of the clock stream and the current playback time of the second media stream. If the current playback time of the second media stream is less than the current playback time of the clock stream, the playback rate of the second media stream can be increased. On the other hand, if the current playback time of the second media stream is greater than the current playback time of the clock stream, the playback rate of the second media stream can be decreased.

The playback rate of the second media stream can be calculated using the equation:

$$\frac{time_c + \text{interval} - time_s}{\text{interval}}$$

where $time_c$ is equal to the current playback time of the clock stream, $time_s$ is equal to the current playback time of the second media stream, and interval is equal to a length of time of a next interval.

The first media stream and the second media stream can be video streams, audio streams, and/or parallel tracks and can be seamlessly switched between.

Other aspects of the inventions include corresponding systems and computer-readable media. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for synchronizing media streams or files, such as audio and video streams, within a media presentation by dynamically adjusting the playback rate of one or more of the streams relative to a reference (clock) stream. The techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

Figure 1:
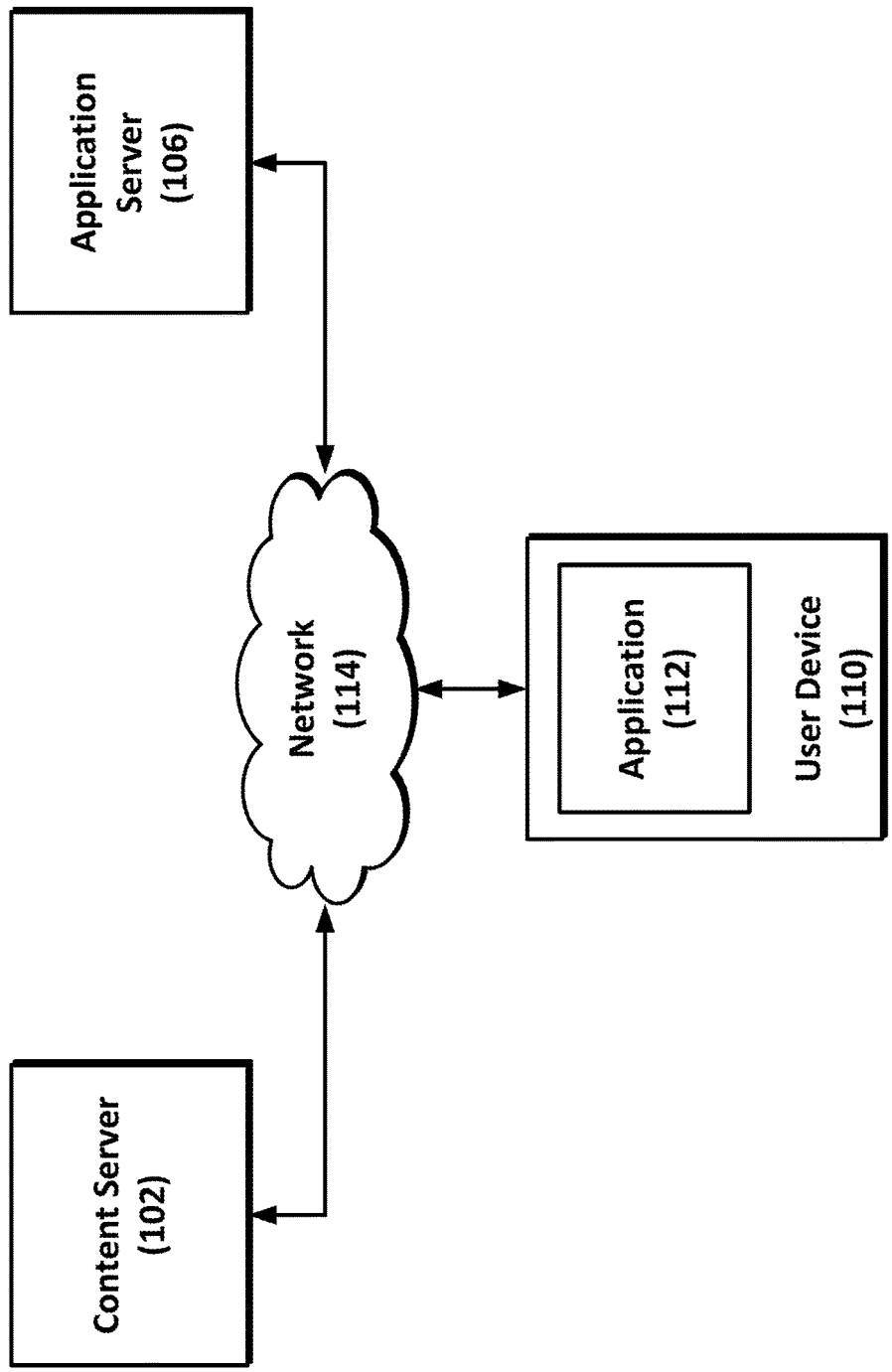
FIG. 1 depicts a high-level system architecture according to an implementation.

FIG. 1 depicts an example system for media stream synchronization according to an implementation. A media presentation having multiple video and/or audio streams can be presented to a user on a user device 110 having an application 112 capable of playing and/or editing the content. The user device 110 can be, for example, a smartphone, tablet, laptop, palmtop, wireless telephone, television, gaming device, virtual reality headset, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein. The user device 110 can have output functionality (e.g., display monitor, touchscreen, image projector, etc.) and input functionality (e.g., touchscreen, keyboard, mouse, remote control, etc.).

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The media presentations referred to herein can be structured in various forms. For example, a particular media presentation can be an online streaming video having one video stream and one audio stream. In other implementations, a media presentation includes multiple tracks or streams that a user can switch among in real-time or near real-time. In one implementation, the video presentation is an interactive video based on a video tree, hierarchy, or other structure. A video tree can be formed by nodes that are connected in a branching, hierarchical, or other linked form. Nodes can have an associated video segment, audio segment, graphical user interface elements, and/or other associated media. Using, for example, application 112, a user (e.g., a viewer) can watch a video that begins from a starting node in the tree and proceeds along connected nodes. Upon reaching a point where multiple video segments branch off from a currently viewed segment, the user interacts with the video in a manner that results in the selection of the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," and U.S. patent application Ser. No. 14/107,600, filed on Dec. 16, 2013, and entitled "Methods and Systems for Unfolding Video Pre-Roll," the entireties of which are hereby incorporated by reference.

The video segments in a video tree can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played, which can be achieved via input functionality provided by user device 110. The video segments can include, for example, one or more predefined, separate multimedia content segments that can be combined in various manners to create a continuous, seamless presentation such that there are no noticeable gaps, jumps, freezes, delays, or other visual or audible interruptions to video and/or audio playback between segments. In addition to the foregoing, "seamless" can refer to a continuous playback of content that gives the user the appearance of watching a single, linear multimedia presentation or portion of a presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's interactions before or during the playing of content, one or more subsequent multimedia segment(s) associated with the choices can be presented to the user. In some implementations, the subsequent segment is played immediately and automatically following the conclusion of the current segment, whereas, in other implementations, the subsequent segment is played immediately upon the user's interaction with the video, without waiting for the end of the decision period or the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, characteristics associated with user device 110, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the U.S. will see the same beer commercial segment followed by an interview segment with a U.S. citizen; and a user in France is shown only the beer commercial segment.

A multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and users can take multiple paths and experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. The display can hover and then disappear when the decision period ends or when an option has been selected. Further, a timer, countdown or other visual, aural, or other sensory indicator can be presented during the playing of a content segment to inform the user of the point by which he should (or in some cases must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later presentation (or potential presentation).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video presentation between any connecting segments. In some instances, the video continues on to another segment after a certain amount of time if none is chosen, or can continue playing in a loop.

In another implementation, a media presentation can be structured using parallel audio and/or video tracks as described in U.S. patent application Ser. No. 14/534,626, filed on Nov. 6, 2014, and entitled "Systems and Methods for Parallel Track Transitions," the entirety of which is incorporated by reference herein. For example, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

To facilitate near-instantaneous switching among parallel tracks, multiple media tracks (e.g., video streams) can be downloaded simultaneously to user device 110. Upon selecting a streaming video to play, an upcoming portion of the video stream is typically buffered by a video player prior to commencing playing the video, and the video player can continue buffering as the video is playing. Accordingly, in one implementation, if an upcoming segment of a video presentation (including the beginning of the presentation) includes two or more parallel tracks, the application 112 (e.g., a video player) can initiate download of the upcoming parallel tracks substantially simultaneously. The application 112 can then simultaneously receive and/or retrieve video data portions of each track. The receipt and/or retrieval of upcoming video portions of each track can be performed prior to the playing of any particular parallel track as well as during the playing of a parallel track. The downloading of video data in parallel tracks can be achieved in accordance with smart downloading techniques such as those described in U.S. Pat. No. 8,600,220, issued on Dec. 3, 2013, and entitled "Systems and Methods for Loading More than One Video Content at a Time," the entirety of which is incorporated by reference herein.

Upon reaching a segment of the video presentation that includes parallel tracks, the application 112 makes a determination of which track to play. The determination can be based on, for example, an interaction made or option selected by the user during a previous video segment, during a previous playback of a pre-recorded video presentation, prior to playing the video, and so on. Based on this determination, the current track either continues to play or the application 112 switches to a parallel track.

Figure 2:
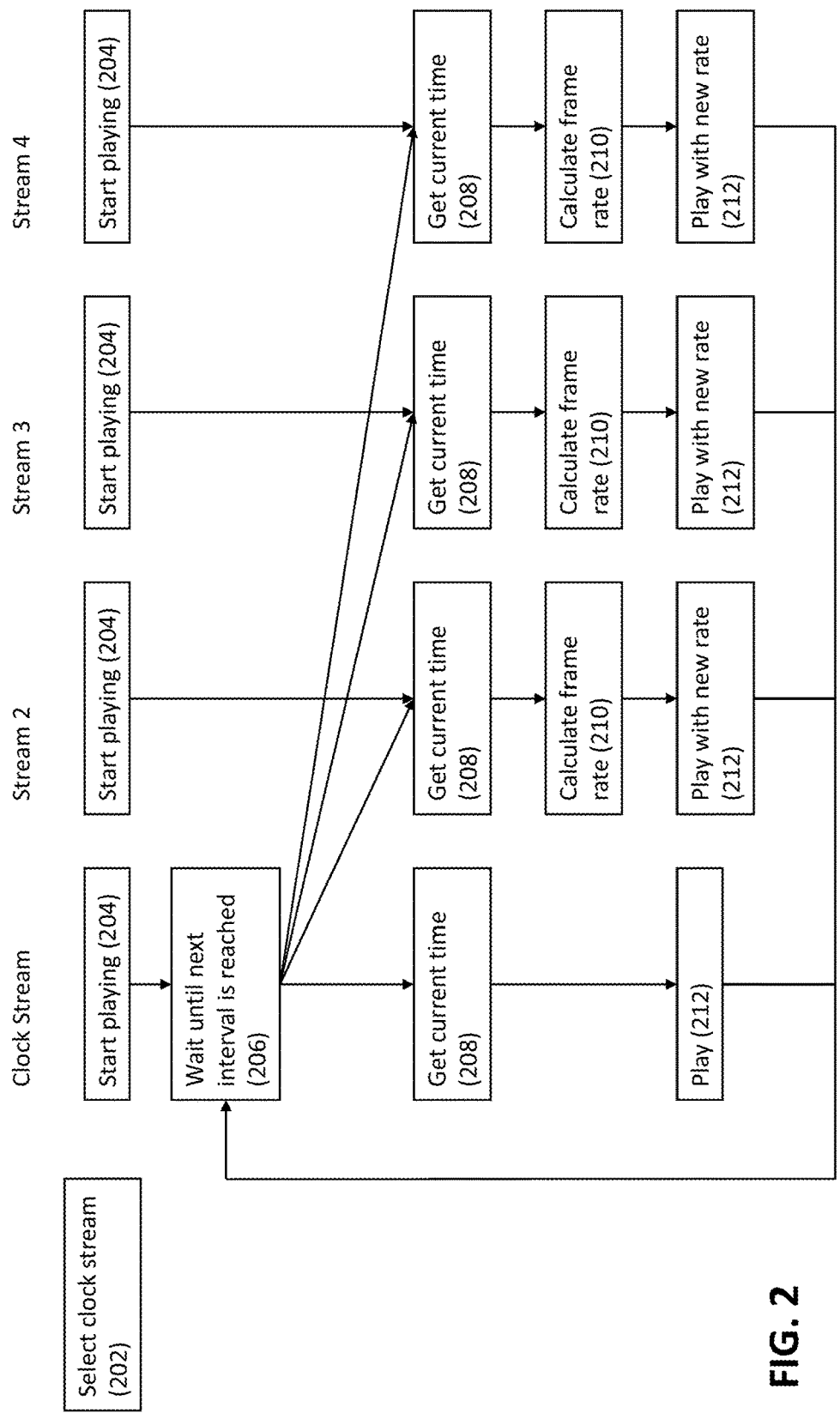
FIG. 2 depicts an example method for media stream synchronization.

FIG. 2 depicts one implementation of a method for synchronizing among two or more media streams by designating one stream as a "clock" or reference stream, and adjusting the playback rate of the other streams to align them with the clock stream over time. When multiple streams are playing (though not necessarily visible to or heard by the user), they may not necessarily remain in sync, whether on account of timing differences in playback functionality provided by the video player, differences in streaming rates of one or more media content sources, availability of bandwidth, and/or other reasons. Synchronization can be performed among audio and video streams (using either as the clock stream) in a linear, branching, and other media presentations, as well as among tracks in a parallel track structured media presentation (using a particular track as the clock stream). In some implementations, the synchronization process is performed by application 112 on user device 110 whereas, in other implementations, the synchronization process is performed by content server 102, application server 106, and/or other server or application.

Synchronization of media streams in the described manner is beneficial in the case where multimedia streams are split into their respective components (e.g., audio streams, video streams, subtitle streams, etc.), for example, to conserve bandwidth when multiple component streams can be combined to provide different multimedia experiences. Rather than transmitting and buffering a large number of possible versions of a multimedia presentation on user device 110, the individual components streams can be transferred and combined by user device 110. For instance, three audio streams can be combined with three video streams to create nine different multimedia presentations (audio 1+video 1; audio 1+video 2; audio 1+video 3; audio 2+video 1, etc.). Rather than transmit the nine different audio/video combinations over a network to user device 110, the six individual audio and video streams can instead be transferred to and combined at user device 110, requiring less data transfer per stream as well as cumulatively among streams.

In STEP 202, a stream or track is selected as the clock stream. The clock stream can be selected from all available streams in the media presentation (e.g., streams that are currently being played by application 112). The selection of the clock stream can be made randomly or can be manually designated by a content creator, content editor, or other person. In some instances, a video stream is selected as the clock stream. In other instances, an audio stream is selected as the clock stream. The clock stream can be selected prior to, simultaneously with, or after the streams start playing. Other manners of selecting the clock stream are contemplated. The clock stream can be selected at the start of the media presentation, prior to the playback of one or more of the streams. In other instances, the clock stream can be selected (and the synchronization process can commence) at any point during playback of the media presentation.

In STEP 204, one or more streams in the start playing. Multiple streams can start playing simultaneously. The example process shown in FIG. 2 includes four streams, with the first stream being designated as the clock stream; however, any number of streams, within technical limitations (e.g., available processing power and memory), is possible. While the streams are playing, a global playback time is tracked over a plurality of time intervals. The global playback time can be a measurement of the actual amount of time that one or more of the streams have been playing, or the amount of time passed since a particular point (e.g., from the start of a current time interval). The time intervals can be fixed length (e.g., 500 ms, 1 second, 3 seconds, etc.) or variable length. In other implementations, the global playback time is tied to the clock stream. That is, rather than using a real measurement of time, the determination of an interval can be based on the current playback timestamp of the clock stream. Thus, for example, a one second interval can be specified as timestamp 0 sec to timestamp 1 sec of the clock stream, even if it takes less or more real time to actually play that much of the clock stream.

Upon reaching the end of an interval of time (STEP 206), the current playback time according to the respective timestamp of each playing stream is determined (STEP 208). In the case where the global playback time is an actual time measurement, the timestamp of each stream may be less than, equal to, or greater than the end of interval time (e.g., if the global playback time at the end of the current interval is 3.0 sec, the current playback timestamps of the streams will likely be roughly clustered around 3.0 sec). If time intervals are determined according to the clock stream, the current playback timestamp of the clock stream will correspond to the global playback time for each time interval, whereas the remainder of the streams will have varying current playback timestamps.

In STEP 210, a playback rate modifier for each stream is calculated using the current playback time of the clock stream (either absolute, or relative to the previous interval or another interval), the current playback time of the stream to be synchronized (measured in the same manner as the playback time of the clock stream; i.e., either absolute, or relative or the previous interval or another interval), and the length of time of the next interval. In one implementation, the playback rate modifier is calculated as:

$$RateModifier = \frac{time_c + interval - time_s}{interval}$$

where $time_c$ is the current playback time of the clock stream (e.g., absolute or relative to the start of current interval), $time_s$ is the current playback time of the second media stream (measured the same as the clock stream, e.g., absolute or relative to the start of the current interval), and interval is the length of time over which the stream will be synchronized (e.g., this can be the length of time of the next interval). The modifier can also be represented as:

$$RateModifier = \frac{time_c - time_s}{interval} + 1$$

Using these values, the playback rates of the streams other than the clock stream are adjusted (slowed, sped up, or not changed) in order to attempt to have all of the playing streams, including the clock stream, reach the end of the next interval with the same or substantially the same current playback timestamp (STEP 212). Because, in the general case, the current playback times of the streams do not substantially deviate from the current playback time of the clock stream at each interval, the adjustments made to the stream playback rates are small, resulting in changes in stream playback speed that are unnoticeable to the human ear or eye.

In other implementations, where the global playback time is an actual time measurement, the playback rate of all streams, including the clock stream, can be adjusted and synchronized to the actual time by using the global playback time as the current clock stream playback time in the above formula.

In one implementation, if a stream becomes significantly desynchronized from the clock stream, a "jump" operation can be performed on the stream instead of or in addition to a playback rate adjustment. Under normal operation, upon reaching the end of a time interval, the current playback time of the stream to synchronize is determined. If the difference between the current playback time of the clock stream and the stream to synchronize exceeds a threshold, the playback time of the latter can be seeked or "jumped" to the playback time of the clock stream, and then played at normal speed over the next time interval. The threshold can be set based on how much of a change in playback rate would be noticeable or distractive to a user. For example, if the difference in current playback times between the clock stream and the stream to synchronize would necessitate more than a 5% increase or decrease in playback rate (i.e., rate modifier <0.95 or rate modifier >1.05), then a jump operation can be performed on the stream to be synchronized.

Figure 3A:
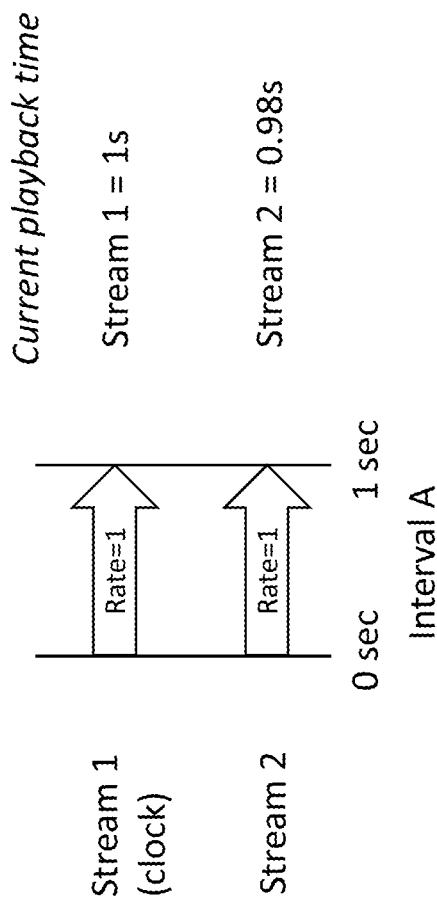
FIGS. 3A and 3B depict an example application of a method for media stream synchronization.
Figure 3B:
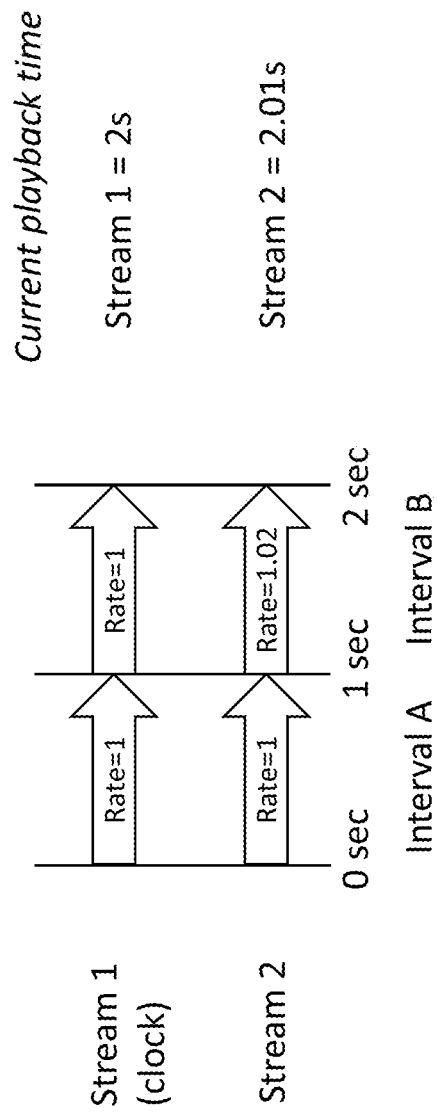

FIGS. 3A and 3B depict an example application of the media stream synchronization method for two streams (e.g., an audio and video stream). Referring to FIG. 3A, during Interval A (between time 0 sec and time 1 sec), Stream 1 and Stream 2 are simultaneously played with a playback rate of 100% (normal speed). At the end of Interval A, the current playback time for Stream 1 is 1 second, and the current playback time for Stream 2 is 0.98 seconds. That is, over Interval A, for some reason or another, Stream 1 and Stream 2 have become desynchronized by 0.02 seconds. To have both streams reach the end of Interval B (a one-second interval) with the same current playback time, the playback rate of Stream 2 is adjusted (in this case, increased, because that stream is behind Stream 1) for the length of Interval B. Using Stream 1 as the clock stream, $time_c$ is equal to 1 second, $time_s$ is equal to 0.98 seconds, and the length of the next interval is equal to 1 second. The rate modifier is then calculated as:

$$RateModifier = \frac{1.0 + 1.0 - 0.98}{1.0} = 1.02$$

Referring now to FIG. 3B, the rate modifier of 1.02 is applied to the playback rate of Stream 2 over Interval B (i.e., playing the stream at a speed of 102% between time=1 sec and time=2 sec). From a purely mathematical standpoint, Stream 1 and Stream 2 should reach the end of Interval B with the same current playback time (i.e., 2 sec). However, external factors such as download speed, processor timing, buffering, etc., can continue to affect the streams throughout playback. In the depicted example, Stream 2 reaches the end of Interval B with a current playback timestamp of 2.01 sec. The synchronization between Stream 1 and Stream 2 has been improved by 0.01 sec, but further rate adjustment is needed. Over the next time interval, the playback rate of Stream 2 can be accordingly adjusted (reduced), as well as adjusted over future intervals, if necessary.

To provide for a smoother experience, the above rate modifier calculation results in a constant multiplier applied over the entirety of Interval B. It is to be appreciated, however, that other rate modifier calculations can be used that cause different multipliers to be applied over the course of an interval while still arriving at the same result. For instance, it can be desirable to increase or decrease the playback rate of certain time portions of a stream more or less significantly compared to other time portions of a stream. As one example, if a portion of a media stream contains minimal video content (e.g., fadeout, black screen, credits) and/or audio content (e.g., silence, quiet music), it may be less noticeable to the viewer to change the playback rate of such portions while not adjusting (or adjusting by a lesser amount) the rate of other portions. Recognition of such portions of a media stream can be made automatically using video and/or audio recognition techniques, and/or can be manually defined by a content creator or editor.

Figure 4:
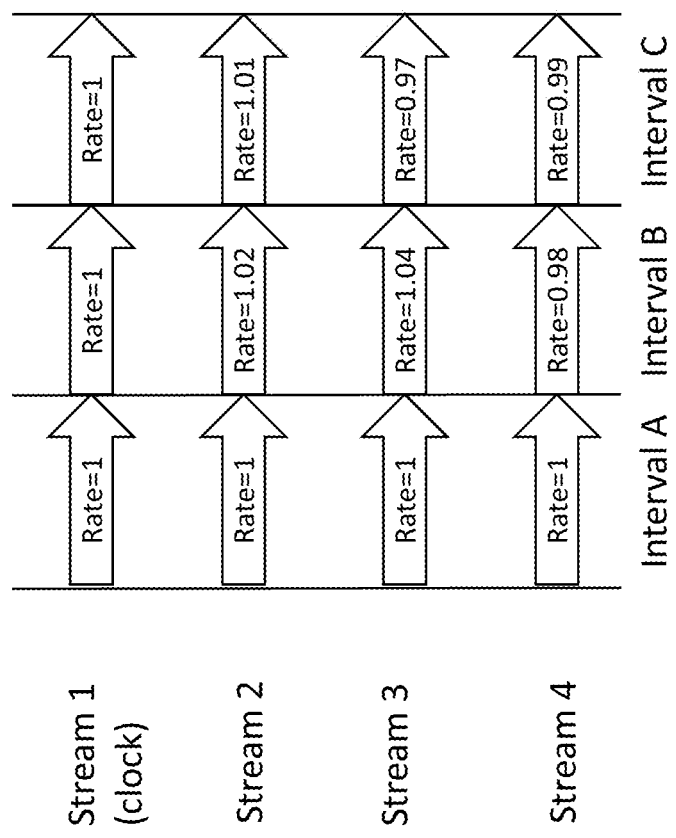
FIG. 4 depicts an example application of a method for parallel track synchronization.

FIG. 4 depicts an example application of the media stream synchronization method for four continuously playing parallel tracks (e.g., four audio/video tracks). One track (here, Stream 1) is selected as a clock track to which the other tracks are synchronized over each time interval. During Interval A, each stream is played at its normal playback rate (100% speed, rate multiplier of 1.0). At the end of Interval A, the playback rate of Streams 2, 3, and 4 are adjusted according to a rate modifier calculation such as that provided above. In the depicted example, the playback rates of Stream 2 and Stream 3 are increased (rate multipliers equal to 1.02 and 1.04, respectively), and the playback rate of Stream 4 is decreased (rate multiplier equal to 0.98), over the length of Interval B. At the end of Interval B, because the streams are still not perfectly synchronized, the playback rates of Streams 2-4 are again adjusted (rate multipliers equal to 1.01, 0.97, and 0.99, respectively) for playback over the next time interval (Interval C). Recalculation of stream playback rate modifiers can continue at the end of each interval to keep the streams substantially synchronized, such that switching among playing parallel tracks can occur seamlessly.

Although the systems and methods described herein relate primarily to audio and video presentation, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
   receiving a video presentation comprising a plurality of media streams, each media stream having a respective playback rate;
   selecting a first one of the media streams as a clock stream;
   playing simultaneously the media streams according to their respective playback rates; and
   synchronizing at least a second one of the media streams with the clock stream, the synchronizing comprising:
      determining that an end of a first time interval has been reached;
      determining, at the end of the first time interval, a current playback time of the clock stream and a current playback time of the second media stream; and
      modifying the playback rate of the second media stream based on the current playback time of the clock stream and the current playback time of the second media stream, the modifying comprising calculating a new playback rate for the second media stream as a function of (1) a difference in current playback times between the clock stream and the second media stream and (2) a length of time of a next interval.

2. The method of claim 1, wherein the synchronizing is performed for each of a plurality of time intervals.

3. The method of claim 2, wherein the synchronizing comprises modifying the playback rate of the second media stream at an end of a first time interval to cause a playback time of the second media stream to be substantially the same as a playback time of the clock stream at an end of a second, later time interval.

4. The method of claim 2, wherein a length of each of the time intervals is fixed.

5. The method of claim 1, wherein the modifying comprises increasing the playback rate of the second media stream if the current playback time of the second media stream is less than the current playback time of the clock stream.

6. The method of claim 1, wherein the modifying comprises decreasing the playback rate of the second media stream if the current playback time of the second media stream is greater than the current playback time of the clock stream.

7. The method of claim 1, wherein calculating the new playback rate for the second media stream is by:

$$\frac{time_c + interval - time_s}{interval}$$

wherein $time_c$ is equal to the current playback time of the clock stream,
wherein $time_s$ is equal to the current playback time of the second media stream,
and wherein interval is equal to a length of time of a next interval.

8. The method of claim 1, wherein the first media stream and the second media stream are selected from the group consisting of a video stream and an audio stream.

9. The method of claim 1, wherein the first media stream and the second media stream are video streams that play in parallel and can be seamlessly switched between.

10. A system comprising:
    at least one memory storing computer-executable instructions; and
    at least one processor for executing the instructions stored on the memory, wherein execution of the instructions programs the at least one processor to perform operations comprising:
       receiving a video presentation comprising a plurality of media streams, each media stream having a respective playback rate;
       selecting a first one of the media streams as a clock stream;
       playing simultaneously the media streams according to their respective playback rates; and
       synchronizing at least a second one of the media streams with the clock stream, the synchronizing comprising:
          determining that an end of a first time interval has been reached;
          determining, at the end of the first time interval, a current playback time of the clock stream and a current playback time of the second media stream; and
          modifying the playback rate of the second media stream based on the current playback time of the clock stream and the current playback time of the second media stream, the modifying comprising calculating a new playback rate for the second media stream as a function of (1) a difference in current playback times between the clock stream and the second media stream and (2) a length of time of a next interval.

11. The system of claim 10, wherein the synchronizing is performed for each of a plurality of time intervals.

12. The system of claim 11, wherein the synchronizing comprises modifying the playback rate of the second media stream at an end of a first time interval to cause a playback time of the second media stream to be substantially the same as a playback time of the clock stream at an end of a second, later time interval.

13. The system of claim 11, wherein a length of each of the time intervals is fixed.

14. The system of claim 10, wherein the modifying comprises increasing the playback rate of the second media stream if the current playback time of the second media stream is less than the current playback time of the clock stream.

15. The system of claim 10, wherein the modifying comprises decreasing the playback rate of the second media stream if the current playback time of the second media stream is greater than the current playback time of the clock stream.

16. The system of claim 10, wherein calculating the new playback rate for the second media stream is by:

$$\frac{time_c + \text{interval} - time_s}{\text{interval}}$$

wherein $time_c$ is equal to the current playback time of the clock stream, wherein $time_s$ is equal to the current playback time of the second media stream, and wherein interval is equal to a length of time of a next interval.

17. The system of claim 10, wherein the first media stream and the second media stream are selected from the group consisting of a video stream and an audio stream.

18. The system of claim 10, wherein the first media stream and the second media stream are video streams that play in parallel and can be seamlessly switched between.

* * * * *